Figure 1:
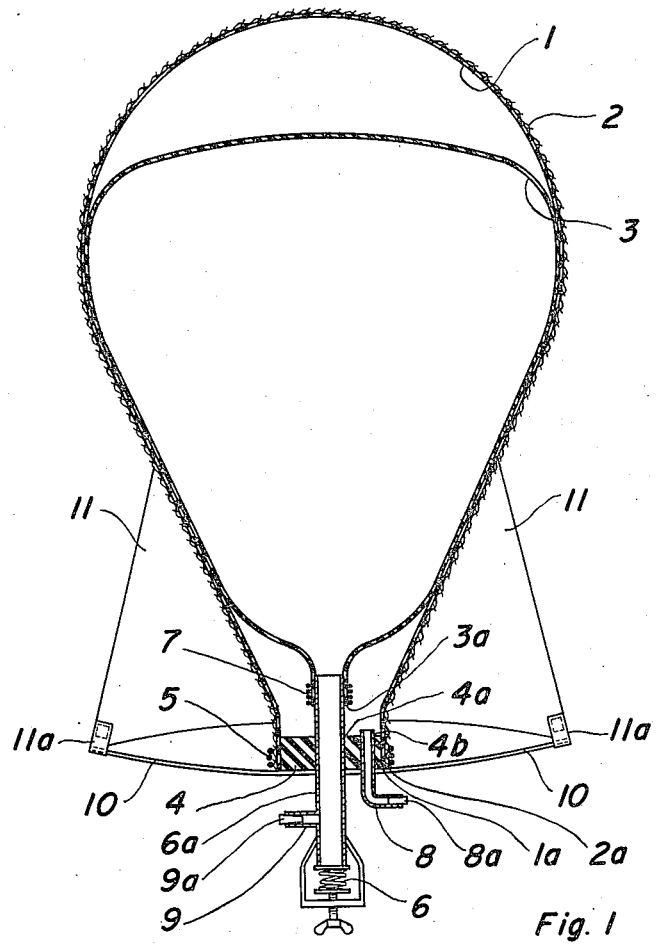

Dec. 27, 1949  L. W. ISOM  2,492,800
FAST RISING SOUNDING BALLOON
Filed Aug. 16, 1948

INVENTOR.
Langley W. Isom
BY
Theodore C. Browne

Patented Dec. 27, 1949

2,492,800

UNITED STATES PATENT OFFICE 2,492,800

FAST RISING SOUNDING BALLOON

Langley W. Isom, Belmont, Mass., assignor to Dewey and Almy Chemical Company, North Cambridge, Mass., a corporation of Massachusetts Application August 16, 1948, Serial No. 44,512

2 Claims. (Cl. 244—97)

This invention relates to a fast-rising balloon having a non-elastic envelope.

The ascension rate of elastic balloons is much limited by the effects of the atmosphere on the shape of the balloon. As such a balloon rises there is a relative wind velocity acting against the top of the balloon. This velocity head tends to flatten the balloon, causing the horizontal diameter to increase and the vertical diameter to decrease, resulting in an oblate spheroid balloon. Unfortunately, the balloon does not even maintain this deformed shape, but, because of internal restoring forces and the resulting decreased velocity, springs back approaching its original spherical form. The net result is an oscillation between an oblate spheroid and a near-spherical form.

This oscillation can be overcome and the ascension rate can be increased if sufficient pressure can be maintained within the balloon to keep it tight and rigid. The pressure cannot be increased in an elastic balloon. Introduction of more gas causes such a balloon to expand; the pressure remains constant. To maintain sufficient pressure within a balloon to keep it rigid requires the envelope to be non-elastic. Heretofore the usual practice with non-elastic balloons has been to fill the balloon with the desired gas, helium or hydrogen, and then provide means for allowing the gas to escape as the relative internal pressure increases during the ascension of the balloon. If this were not done the envelope would soon burst from the increased internal relative pressure. Allowing the escape of gas in this manner causes the ascension velocity to decrease during the ascension until sufficient gas escapes for the net lifting force to be zero, when it levels off and maintains a constant altitude. This effect is undesirable in sounding balloons which are used to carry instruments to the desired altitudes and then burst to release the instruments. It is desirable that such a balloon, especially when carrying a radiosonde, rise at a constant velocity until it bursts. Allowing gas to escape in this manner is also a waste of gas. Sufficient gas to provide the desired buoyancy at the proper altitude is all that need be used. This amount of gas would fill the balloon at the proper altitude, but not at sea level where the pressure is greater. The rest of the gas is used merely to fill the balloon at sea level.

Another advantage of a non-elastic balloon over an elastic balloon is the greater freedom of shape. Elastic balloons, because of the nature of the envelopes, tend to be spherical. It is difficult to avoid this shape limitation. On the other hand a non-elastic balloon can be made in shapes deviating widely from spherical. Such a balloon can be made streamlined and thus have a still higher ascension velocity.

It is the object of my invention to produce a non-elastic balloon that maintains a constant lifting force, ascends at a constant velocity, vents no gas, and is at all times filled and rigid.

Figure 2:
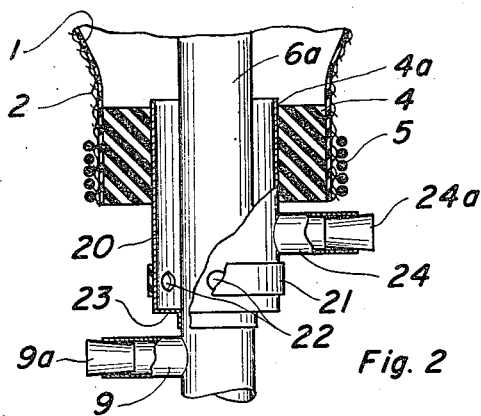

My invention will become evident from the drawings. Figure 1 shows a vertical section of the balloon with means for accomplishing the above objects. Figure 2 is a partial vertical section of another feature of this invention.

The balloon consists of an elastic envelope 1 having a neck 1a. This envelope 1 is completely surrounded by a light-weight non-elastic fabric envelope 2 so constructed as to be elongated vertically and wider at the top than at the bottom to give the balloon when filled with gas a streamlined shape. In the necks 1a and 2a of these envelopes 1 and 2 is a light, non-porous plug 4 having a cylindrical aperture 4a through the center, and another smaller cylindrical aperture 4b through another part of the plug 4. The necks 1a and 2a of the envelopes 1 and 2 are secured to the plug 4 by seizing 5. Through the larger central aperture 4a of the plug 4 is inserted the entrance tube 6a of a constant differential pressure valve 6, the outlet of which vents to the atmosphere. This valve 6 consists simply of the tube 6a which is closed by an adjustable spring loaded diaphragm. Inside of the envelopes 1 and 2 is an elastic envelope 3 having a neck 3a. The neck 3a communicates to the constant differential pressure valve 6 by inserting the entrance tube 6a of the valve 6 into the neck 3a and securing the neck 3a around the tube 6a by seizing 7 in the same manner that the necks 1a and 2a of the envelopes 1 and 2 are secured to the plug 4.

I have found a fineness ratio (the ratio of height to greatest width) of about 2:1 to be the most satisfactory. Balloons with ratios substantially lower than this are less streamlined resulting in a sacrifice of ascension velocity. Increasing the fineness ratio of the balloon substantially above 2:1 increases the ratio of surface area to volume resulting in larger and heavier envelopes which are not warranted by any substantial increase in ascension velocity.

To increase the stability of the balloon during its ascension it has been found desirable to provide three or four fins 11—11 near the lower end of the balloon. These fins 11—11 consist of approximately triangular pieces of a strong fabric as balloon cloth symmetrically placed near the tail of the balloon in vertical axial planes. The fins 11—11 are secured to the fabric envelope 2 and are held distended by radial bowed spring strut rods 10—10 the ends of which rods fit into pockets 11a—11a provided at the outermost corners of the fins 11—11. The inner ends of the strut rods 10—10 are secured to the lower side of the end plug 4. A more detailed description of the fins 11—11 and struts 10—10 assembly is given in United States Letters Patent, Number 2,398,744.

The envelopes are filled with gas through the tubes 8 and 9. Tube 8 passes through the smaller aperture 4b in plug 4 and communicates with the interior of the envelope 1, and is secured tightly to the inner wall of the smaller aperture 4b in plug 4 to prevent the leakage of gas. The tube 8 is conveniently closed by the tapered plug 8a. Tube 9 enters the entrance tube 6a of the valve 6 and is in communication with the interior of the envelope 3 through the entrance tube 6a of valve 6. Tube 9 is conveniently closed by the tapered plug 9a.

In operation the envelope 1 is inflated by connecting the open end of tube 8 to a hose which leads to a source of gas, as hydrogen or helium. Sufficient gas is introduced to the interior of envelope 1 to impart to the balloon the desired lifting force. This can be done conveniently by temporarily securing to the balloon a weight equal to the desired lifting force and allowing gas to enter the envelope 1 through the tube 8 until the balloon will just lift this weight from the ground. Tube 8 is then closed with the stopper 8a, and the weight is removed. The constant differential pressure valve 6 is then adjusted to allow the escape of air from the interior of the envelope 3 when the pressure within the envelope 1 increases beyond the amount sufficient to hold the envelope 1 and its surrounding envelope 2 completely distended. Air is then introduced through the tube 9 into the envelope 3 in similar manner until the envelope 3 has expanded sufficiently to raise the pressure in the envelope 1 to the desired amount at which point the differential pressure relief valve 6 opens prohibiting the entrance of more air into the envelope 3. At this point the tube 9 is closed by the plug 9a.

The pressure in envelope 3 is determined solely by the pressure in envelope 1 and is always higher than the pressure in envelope 1 by a constant and very slight amount. By maintaining a constant pressure relative to the atmospheric pressure within the envelope 3 by means of the constant differential pressure valve 6, a constant relative pressure is maintained within the envelope 1. As the balloon rises and the atmospheric pressure decreases the relative pressures within the envelopes 1 and 3 tend to increase. Both of these tendencies reflect on the pressure within envelope 3, and any increase in the relative pressures opens the constant differential pressure valve 6 thereby allowing the escape of air from envelope 3. The increase in the volume of the gas in envelope 1 is compensated by the deflation of the envelope 3. No gas escapes from envelope 1 resulting in a constant lifting force. Since all of the expansion of the gas in envelope 1 is provided for by the deflation of envelope 3 there is no change in the size or shape of the balloon.

Alternatively the non-elastic outer envelope 2 and the elastic inner envelope 1, or gas cell, can be combined as a single non-elastic envelope made, for example, from thin sheet plastic material such as polyethylene or polyvinylidene chloride. However, I prefer the two envelope structure because gas-tight elastic envelopes are easier and cheaper to manufacture and have proved more dependable.

The altitude to which the balloon will ascend depends on the size of the outer envelopes 1 and 2 and the load that the balloon carries. The volume of the outer envelopes must be such as will be completely filled by the amount of gas that is required to lift the load with the desired lifting force at the proper altitude. After all the air has escaped from the inner envelope 3, the relative pressure within the outer envelope 1 increases with a further ascent of the balloon, causing the outer envelopes to burst.

A balloon to carry 1700 grams to 45,000 feet at 2,850 feet per minute has the following characteristics: Fineness ratio, 2:1; total volume 4,189 cubic feet; volume of hydrogen at sea level and 70 degrees Fahrenheit, 524 cubic feet. This amount of hydrogen in a non-elastic balloon provided with outlet means for the hydrogen as it expands would carry the balloon to only 27,000 feet. A hydrogen-filled non-elastic balloon with outlet means for the hydrogen would require 1,839 cubic feet of hydrogen at sea level to reach 45,000 feet. An elastic balloon containing 524 cubic feet of hydrogen would rise at a rate of only about 1,800 feet per minute, about ⅔ the rate of my balloon.

The advantages of my invention are obvious. My balloon ascends always with the same size and shape, making streamlining feasible, and always with a constant lifting force. Balloons having sealed elastic envelopes have a constant lifting force, but do not ascend with a constant size and shape. Ordinary balloons with non-elastic envelopes maintain the same size and shape, but require a continual venting of gas which results in a continually decreasing lifting force and the asymptotic approach to a constant altitude. My balloon is ideal for operations which require a rapid ascent to the proper altitude whereupon the balloon bursts, as with sounding balloons.

The principle of my invention can also be applied to a high-flying, constant-level balloon by providing a separate differential pressure valve in communication with the interior of the outer non-elastic envelope. This valve is adjusted to open when the pressure in the non-elastic outer envelope increases beyond the pressure required to open the constant differential pressure valve in communication with the inner envelope. Venting from the outer envelope does not occur until all the air is vented from the inner envelope. Consequently, after the air from the inner envelope is exhausted, a further ascent does not cause the balloon to burst but results in a venting of the lifting gas and a continual decrease in the ascension velocity to zero when the balloon maintains a constant altitude. This provides a fast-rising, constant-velocity, constant-level balloon. Higher altitudes are also realized for there is no escape of gas until after the balloon reaches the altitude where the inner air-containing envelope is completely deflated.

This aspect of my invention is shown in Figure 2. The second constant differential pressure valve consists of the tube 20 concentric with the tube 6a, sealed at its outer end by the flange 23, which flange 23 also secures the tube 20 to the tube 6a. The upper end of the outer tube 20 is in communication with the interior of the outer envelope 1. Near the lower end of the tube 20, spaced circumferentially around the lateral periphery is a number of ports 22, through which gas from the interior of envelope 1 can escape. These ports 22 are closed by an elastic band 21 placed around the lower end of tube 20 in a manner whereby the ports 22 are covered. The tube 24 connects with the interior of the tube 20 and provides a means for inflating the outer envelopes 1 and 2. This tube 24 is closed with the tapered stopper 24a. The tube 24 and stopper 24a in this embodiment of my invention replaces the tube 8 and stopper 8a shown in Figure 1.

The differential pressure that this valve will maintain within the envelope 1 is controlled by the size and number of ports 22 and by the tension of the elastic band 21. This differential pressure need only be such as will not burst the outer envelopes 1 and 2 and can be conveniently preset. Other than allowing the escape of gas from the outer envelope 1 at such an altitude that all the air in the inner envelope 3 has been exhausted, this second valve also has the additional feature of providing an additional safety valve should the inner envelope 3 be overinflated during the inflation of the balloon.

I claim as my invention:

1. A constant-dimension, streamlined, free-flying, self-destructible balloon comprising an unvented, non-elastic, outer envelope having a fineness ratio of about 2:1 adapted to receive a predetermined weight of lifting gas and to retain the gas until the balloon destroys itself and bearing spring extended fins adjacent the tail section adapted to maintain the balloon in stable vertical flight, an elastic inner envelope adapted to contain air, and a valve adapted to maintain a predetermined differential pressure between the air in the inner envelope and the atmosphere and to permit the escape of air from the inner envelope to the atmosphere whenever the predetermined differential pressure in the inner envelope is exceeded and until all the gas from the inner envelope is exhausted.

2. A free-flying balloon having a non-elastic outer envelope adapted to contain gas, a constant differential pressure valve in communication with the interior of the outer envelope and venting to the atmosphere adapted to maintain a predetermined differential pressure less than the pressure required to burst the outer envelope between the gas in the outer envelope and the atmosphere and to allow the escape of gas from the outer envelope to the atmosphere whenever the predetermined pressure differential is exceeded, an elastic inner envelope adapted to contain gas, and a second constant differential pressure valve in communication with the interior of the inner envelope and venting to the atmosphere adapted to maintain a predetermined differential pressure between the gas in the inner envelope and the atmosphere and to vent gas from the inner envelope to the atmosphere whenever the predetermined pressure differential is exceeded and to vent all the gas from the inner envelope before the pressure in the outer envelope is great enough to open the first named valve.

LANGLEY W. ISOM.

REFERENCES CITED

The following references are of record in the file of this patent:

UNITED STATES PATENTS

| Number | Name | Date |
| --- | --- | --- |
| 1,274,207 | Sordyka | July 30, 1918 |
| 1,834,614 | Hall | Dec. 1, 1931 |

FOREIGN PATENTS

| Number | Country | Date |
| --- | --- | --- |
| 1,318 | Great Britain | of 1892 |
| 864,950 | France | Feb. 10, 1941 |